Dec. 30, 1941. A. BOYNTON 2,267,716
THREADLESS DRILL PIPE
Filed June 23, 1939
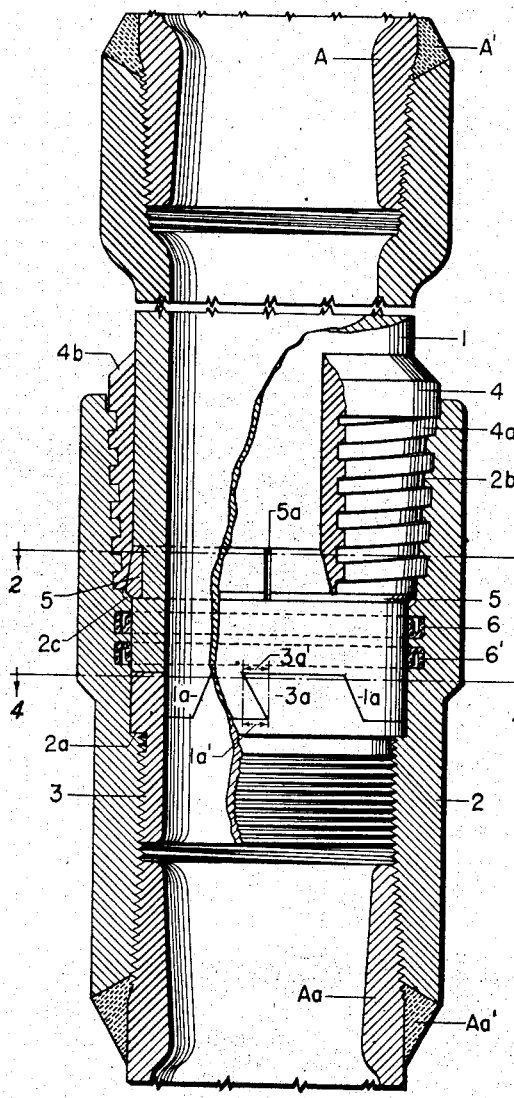
Fig. 1.
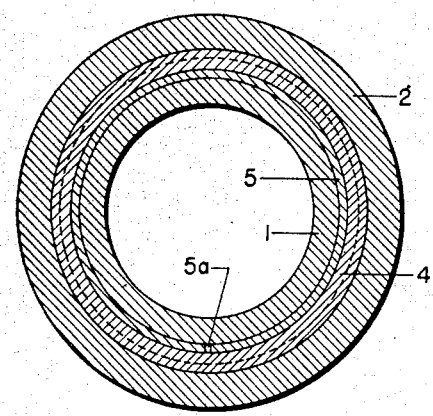
Fig. 2.
Fig. 3.
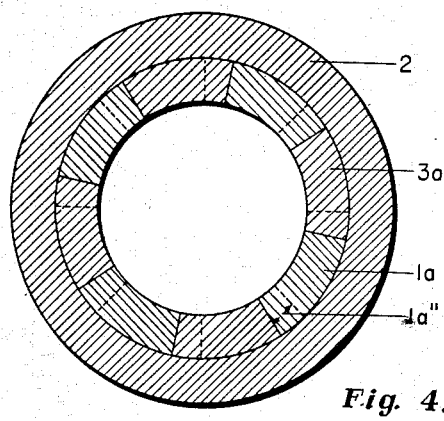
Fig. 4.
Alexander Boynton, Inventor,
Jesse R. Stone
Lester B. Clark
By
Attorneys.

Patented Dec. 30, 1941

2,267,716

UNITED STATES PATENT OFFICE 2,267,716

THREADLESS DRILL PIPE

Alexander Boynton, San Antonio, Tex.

Application June 23, 1939, Serial No. 280,759

4 Claims. (Cl. 285—146)

My invention relates to drill pipe and especially to employing threadless joints thereof in connecting the string of drill stem together.

The principal object is to provide a drill stem which may be rotated either clockwise or anticlockwise without becoming disconnected.

Another object is to attain greater speed in going in and coming out of the hole than can be accomplished by the usual threaded connections.

A further object is to overcome the danger of crushing the male ends of the pipe and of bursting the couplings by employing connection means which does not impart rotary thrusts to the threads.

Another object is to overcome the usual tendency to crystallize the pipe in the connections by employing means of more evenly distributing the rotary forces employed in drilling wells.

These objects are attained by enmeshing segments employed to lock together the abutting ends of the pipe joints; thus preventing independent rotation of the joints; and by enlarging one of the pipe ends and securing this end against withdrawal by means of a bushing engaged within a sleeve surrounding the enlarged end of the pipe.

The foregoing objects and means for attaining them will be explained in the following specification and illustrated in the accompanying drawing, in which—

Fig. 1 is mainly a longitudinal section through the preferred embodiment of the invention, the locking means being shown partly in outside view.

Fig. 2 is a cross section on the line 2—2, Fig. 1.

Fig. 3 is mainly a longitudinal section through a modified form of the invention, the locking means being shown partly in outside view.

Fig. 4 is a cross section on the line 4—4, Fig. 2.

Similar characters of reference are employed to designate similar parts throughout the several views.

In Fig. 1, the drill pipe A may be attached to the upper member 1 of the device by threads and the weld A'. The lower member of the device may be secured to the drill pipe Aa by the weld Aa'.

The upper drill stem connection 1 has depending inclined segments 1a adapted to enmesh with the upstanding inclined segments 3a of the clutch bushing 3. The throw or incline of the enmeshed segments indicated at 1a' and 3a' shows the extent of the engagement between the segments 1a and 3a which will resist pulling apart the members 1 and 3. The clutch bushing 3 has an external annular shoulder engaged upon the mating shoulder 2a of the member 2 by means of the threaded engagement between the members 2 and 3. The upper enlarged portion of the member 3 and the lower portion of the member 1 have slight clearance within the central opening midway of the member 2.

The U cups 6 and 6', which may be of leather or fabric or assume any other suitable shape, are received within annular recesses within the member 2. The U cup 6 looks upward and is adapted to be expanded by fluid pressure from above. The U cup 6' looks downward and is adapted to be expanded by fluid pressure from below. These cups, closely engaged with the member 1, will prevent any leakage of fluid into or out of the drill stem between the members 1 and 2, as is apparent.

A shoulder ring 5 is closely received within an annular recess formed exterior of the member 1. This ring may be of spring steel cut in two at 5a and adapted to be pushed over the member 1 and snapped into the position shown in Fig. 1. The ring extends outwardly of the member 1 and has an upwardly tapering outer surface adapted to be engaged by the member 4 which latter member, of course, must be in place about the member 1 before the snap ring is put in place. There is a slight clearance 2c under the ring 5, in order that the segments 1a and 3a may fully engage.

The locking sleeve 4 has a close sliding fit over the intermediate portion of the member 1 and has heavy threads or spirals 4a adapted to be engaged with the similar threads or spirals 2b of the member 2. Both sets of spirals may be straight or they may be tapered for speed in assembling and taking apart, as shown in Fig. 1.

To form the connection, the members 2, 3, 6. and 6' being previously assembled as shown, insert the member 1 with the sleeve 4 about it with the ring 5 in place above the member 2 and engage the segments 1a and 3a, as appears in Fig. 1. Then screw the locking sleeve 4 downward until its lower beveled extremity firmly contacts the ring 5, the slots 4b being for a special wrench.

While assembled as shown, the interlocked segments 1a and 3a prevent independent rotation of the parts 1 and 2, thus enabling the drill stem to be rotated in either direction without danger of becoming disconnected by rotary strain. The dove-tailed engagement between the segments will require all of the overlapping portions 1a' or 3a' to be torn away or sheared off before these segments can be pulled apart.

Figure 3, which illustrates the modified form, shows that the lower portion of the upper drill stem connection 1A may be of expanded outside diameter proximate its lower end, the expanded portion taking the place of the steel ring 5 in Fig. 1.

In this construction, it is apparent that the locking sleeve 4A must be placed about the member 1A before the coupling B and the member 1A are welded together as at B'.

The clutch bushing 3A, having the upstanding inclined segments 3Aa, has threaded engagement within the member 2A and locks against the internal annular shoulder 2Aa. The member 1A has depending inclined segments 1Aa adapted to enmesh with the upstanding segments 3Aa. The overlapping throw of the segments 1Aa and 3Aa is indicated at 1a'' and 3a''. The locking sleeve 4A has external threads or spirals 4Aa adapted to engage with the similar internal threads or spirals 2Ab of the member 2, the wrench slots 4Ab being for a special wrench as in Fig. 1.

Manifestly, the enlargement proximate the lower end of the member 1A may be sloping, as shown at 1Ab or may have a horizontal upper surface as indicated at 1Ab'. If this enlargement has a horizontal upper surface, as at 1Ab', the lower end of the member 4A, of course, will be, likewise, horizontal to engage upon it. The physical properties of the metal employed in fabricating the members 1A and 4A will determine the form of these engaging surfaces.

It is apparent that the connection is formed by screwing the member 4A down upon the shoulder 1Ab, which shoulder and the throw or overlap of the dovetailed segments then resist the pulling apart strain; while the engaged segments permit the drill stem to be rotated in either direction without danger of accidental disconnection.

If the device is to be employed as a separate tool joint, the drill pipe coupling B and the weld B' may be employed to connect the upper portion of the drill stem to the device, and the lower portion of the drill stem Ba may be similarly joined to the lower member 2A. However, the upper and lower members 1A and 2A of the device may be fabricated of the drill pipe proper, having its ends suitably formed for the purpose; thereby eliminating all couplings and threaded ends upon the pipe and the incidental welds necessary to attach the separate connection members to the drill stem.

It is apparent that various minor changes may be made in the constructions set forth in the specification and drawings, within the scope and purpose of this invention; and I reserve the right to make such changes in carrying out the objects thereof pursuant to the appended claims.

What is claimed is:

1. A pipe coupling including male and female members, a cylindrical collar fixed within said female member, laterally inclined segments projecting inwardly on the inner end of said collar, mating segments on said male member engaged with said first mentioned segments, the inclined sides of said segments acting to resist longitudinal separation of said collar and said male member, a coarsely threaded socket on the upper end of said female member, a shoulder on the outer periphery of said male member, and a sleeve engaging rotatable about said male member and threaded to screw into said socket and bear upon said shoulder.

2. A pipe coupling including male and female members, a clutch bushing fixed in the lower end of said female member, clutch segments on the inner end of said bushing and inclined laterally from the axis of said coupling, clutch segments on said male member engaging with said bushing segments, an outer upwardly inclined shoulder on said male member above said segments, and a sleeve rotatable on said male member and adapted to screw within said female member and engage against said shoulder to lock said members together.

3. A pipe coupling including male and female members, a clutch bushing fixed in the lower end of said female member, clutch segments on the inner end of said bushing and inclined laterally from the axis of said coupling, clutch segments on said male member engaging with said bushing segments and cooperating therewith to prevent relative longitudinal separation, a snap ring fitting within an annular recess in said male member above said segments, the outer surface of said ring projecting outwardly from the surface of said male member to form a shoulder, and a sleeve rotatable on said male member and adapted to screw within said female member and engage against said shoulder to lock said members together.

4. A pipe coupling including male and famale members, outwardly extending and inclined clutch teeth in said female member presenting an outwardly facing shoulder and having their inner faces lying in a cylindrical surface, complementary inclined teeth on the male member adapted to interfit the first mentioned teeth by relative rotation and longitudinal movement of the members whereby said teeth transmit torque and resist relative longitudinal separation of the members, and additional means to clamp the members together with said complementary teeth in close engagement.

ALEXANDER BOYNTON.